Dec. 11, 1956 K. R. RAND ET AL 2,773,583
UNLOADING DEVICE
Filed May 14, 1954 3 Sheets-Sheet 1

INVENTOR
KENNETH R. RAND
ERNEST BRANDENBERGER
BY Bradley Cohn
ATTORNEY

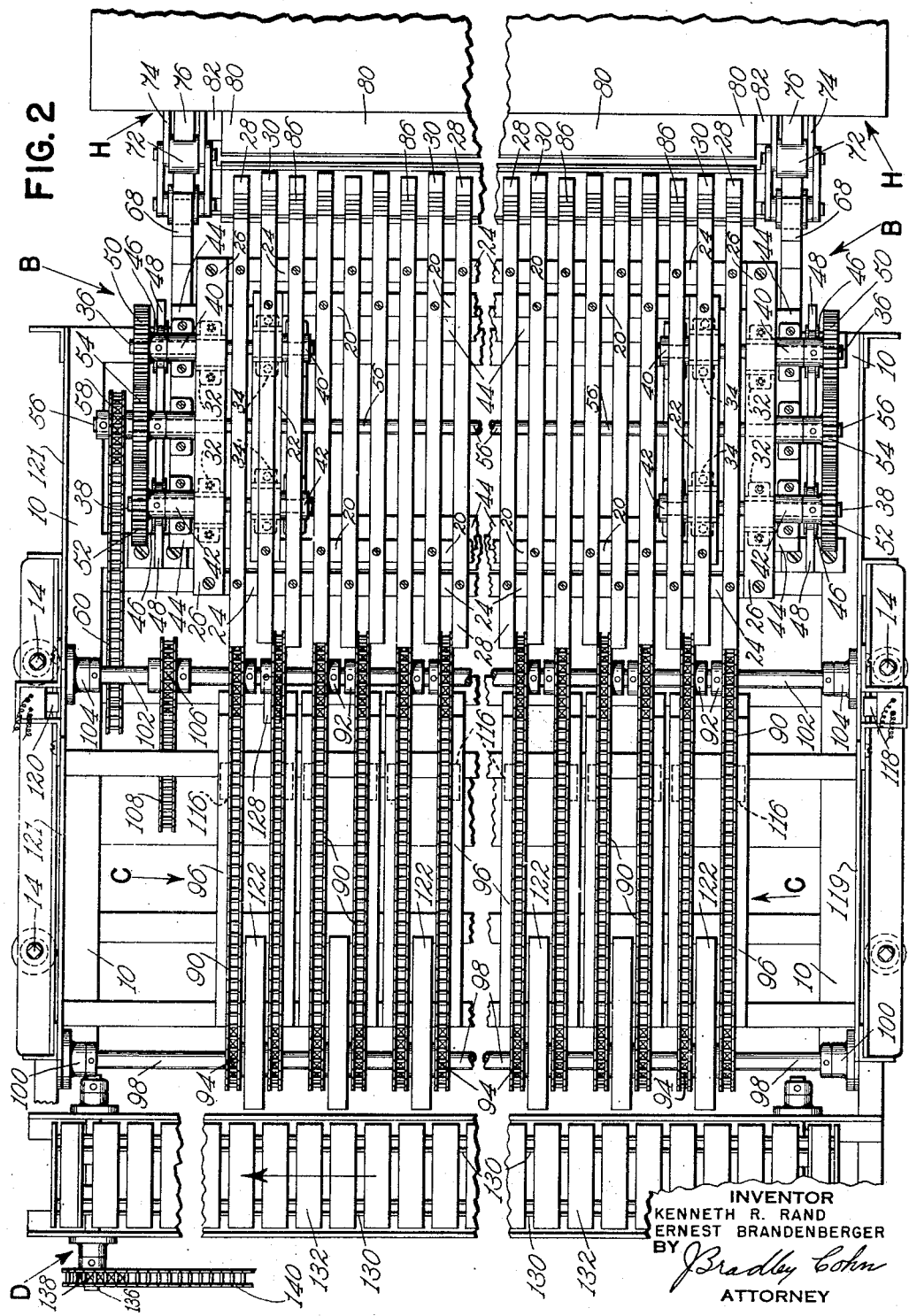

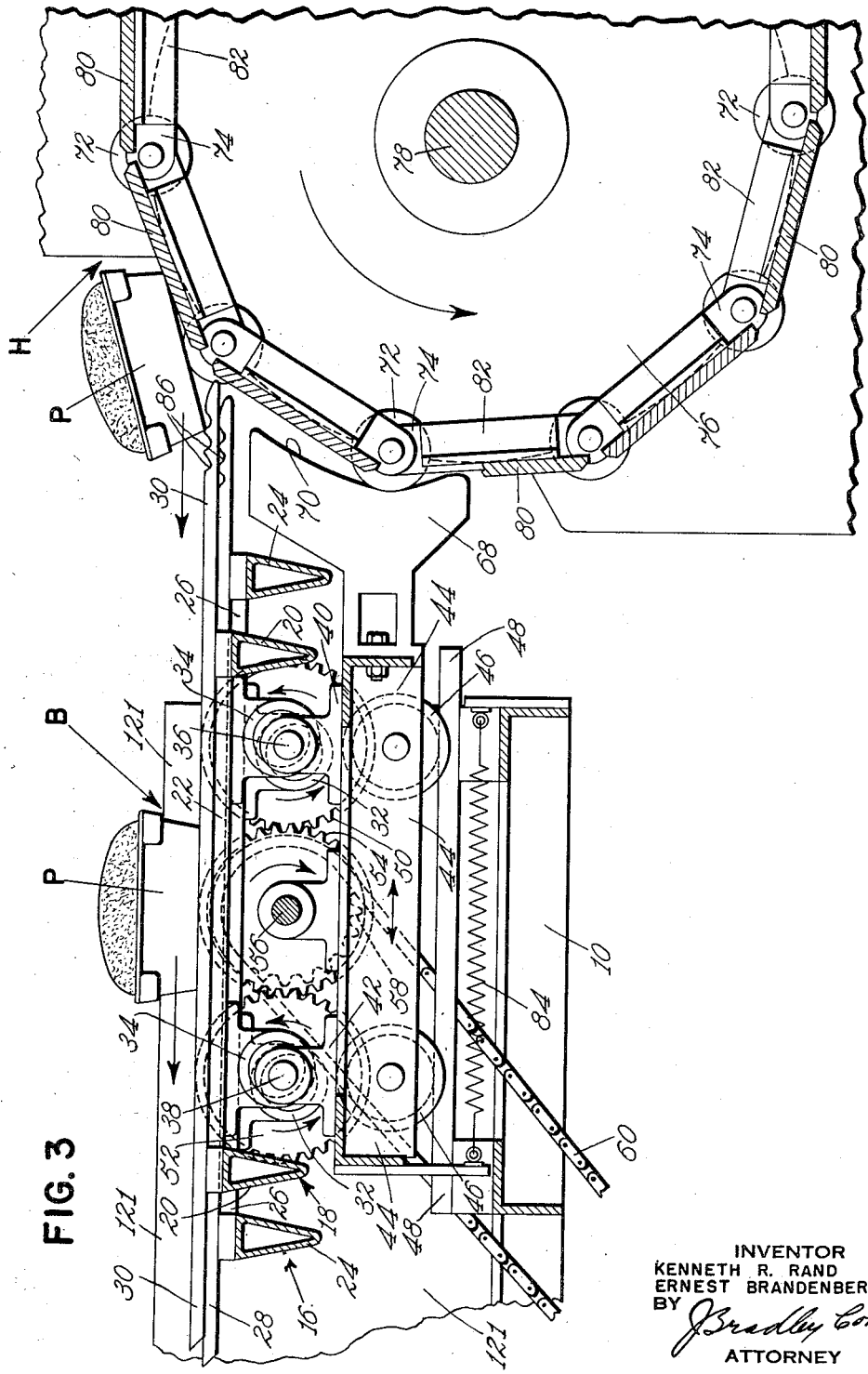

United States Patent Office 2,773,583
Patented Dec. 11, 1956

2,773,583
UNLOADING DEVICE

Kenneth R. Rand, Branford, and Ernest Brandenberger, New Haven, Conn., assignors to American Machine & Foundry Company, a corporation of New Jersey Application May 14, 1954, Serial No. 429,722

13 Claims. (Cl. 198—21)

This invention relates to oven unloading devices, more particularly to a device for unloading a traveling oven or traveling hearth oven, such as used in the baking of bread.

It is an object of our invention to eliminate manual unloading of ovens by providing a simple device to transfer pans from an oven to a transversely operating conveyor in such a manner that the pans will be spaced along the transversely operating conveyor in uniform and regular fashion.

It is a further object of our invention to provide a novel combination of a "walking board" on a carriage that follows the edge of a hearth plate from which a pan is being transferred. It is thus an object of our invention to provide means for accurately following the edge of a hearth plate of a moving hearth oven with the unloading conveyor means.

It is another object of our invention to provide a "walking board" that will follow the edge of a hearth plate as it moves about a sprocket at the unloading end of an oven, and a mechanism in conjunction with the walking board to transfer the pans in suitable alignment on a transverse delivery conveyor.

The novel features which we believe to be characteristic of our invention are set forth with particularity in the appended claims. Our invention itself, however, both as to its organization and method of operation may be understood by reference to the following description taken in connection with the accompanying drawings, in which:

Fig. 2 is a plan view of the same;

Fig. 3 is a sectional side elevation illustrating the oscillating walking board of the unloader in conjunction with the delivery end of a hearth oven.

Figure 1:
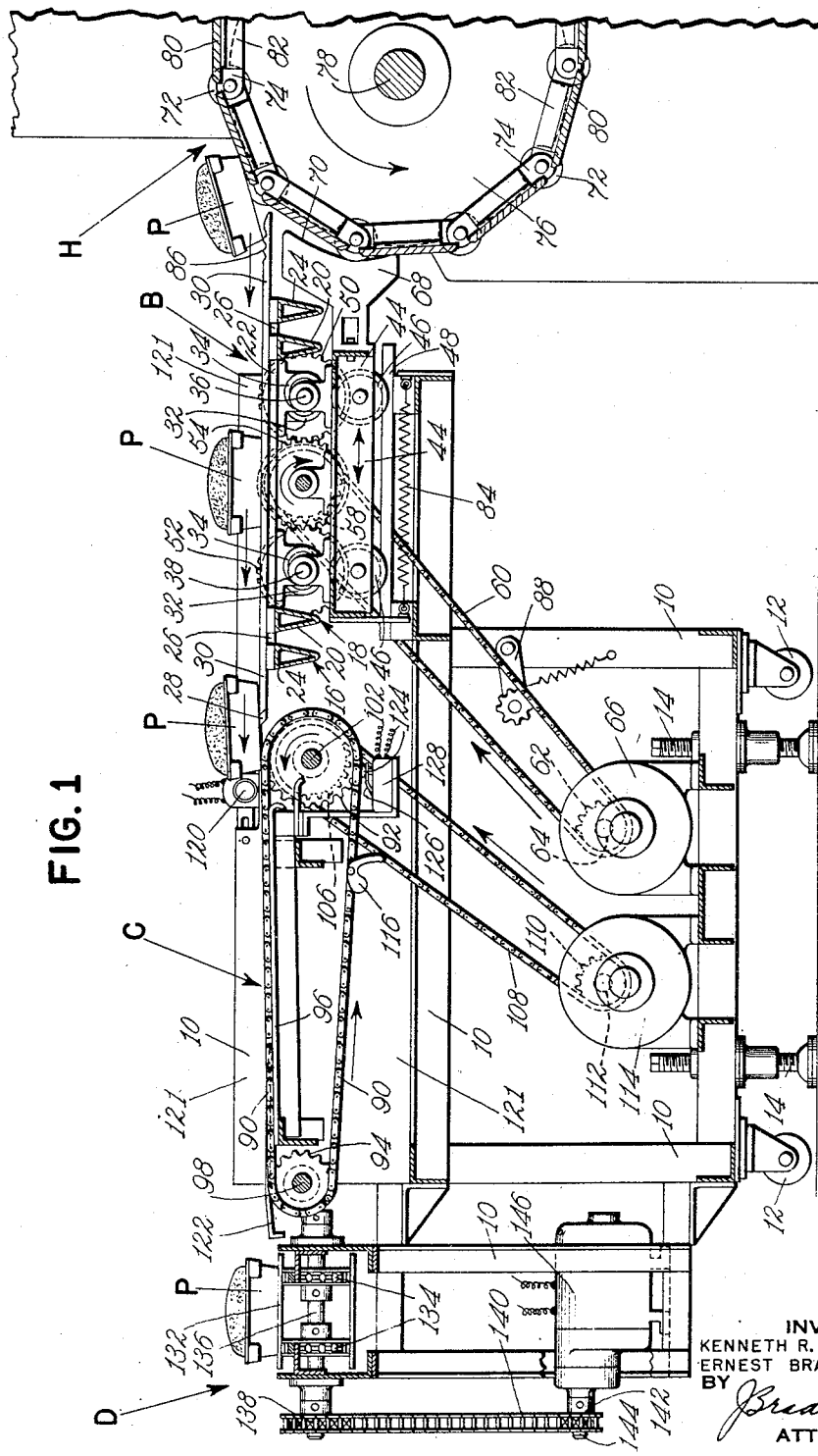
Fig. 1 is a sectional side elevation of the hearth oven unloader.

With reference to the drawings, the hearth oven unloader consists of an oscillating walking board unit B, an intermittently moving aligning conveyor mechanism C and a transverse delivery conveyor D, all mechanisms of which are mounted on and supported by a movable frame structure 10. Frame structure 10 has casters 12 and leveling jacks 14 to lift the entire unloader off its casters and level it with the delivery end of the particular oven.

The oscillating "walking board" or "walking beam" unit B of the unloader consists of two rectangular frames 16 and 18. Frame 18 has two transverse members 20 and two longitudinal members 22. Frame 16 has two transverse members 24 and two longitudinal members 26. Each frame 16 and 18 carries a plurality of equally spaced conveyor bars 28 and 30, respectively, arranged alternately and parallel to each other. Each longitudinal member 22 of frame 18 is secured to a pair of eccentric bearings 32 and each longitudinal member 26 of frame 16 is secured to a pair of eccentric bearings 34. One bearing 32 of each member 22 and one bearing 34 of each member 26 engages with a shaft 36. The other bearings 32 and 34 of each member 22 and 26, respectively, engage with a shaft 38.

The eccentric bearings 32 and 34 on shafts 36 and 38 are arranged 180° apart so that a turning of said shaft causes one frame to go up while the other goes down, thus creating a "walking" motion of conveyor bars 28 and 30 on frames 16 annd 18, respectively. Each shaft 36 and 38 is rotatably supported by means of suitable bearing brackets 40 and 42, respectively, on the framework of a carriage 44. Carriage 44 has a number of wheels 46 supported on a pair of rails 48 mounted on a suitable member of frame structure 10.

Each shaft 36 carries a gear 50 and each shaft 38 carries a gear 52. Each set of gears 50 and 52 engage with a gear 54, both of which are mounted on a transverse shaft 56 rotatably supported by a pair of bearing brackets 58 secured to the frame of the carriage 44. Shaft 56 driven by a sprocket 58 from a chain 60 driven by a sprocket 62 mounted on a shaft 64 protruding from the housing of a gear reduction motor 66 on the frame structure 10.

The carriage 44 carries on its leading end two spaced cam lugs 68. Each cam surface 70 of each cam lug 68 successively engages the rollers 72 of one of the two conveyor chains 74 moving about drive sprockets 76 on shaft 78. Conveyor chains 74 carry a plurality of pan supporting hearth plates 80 secured at each end by brackets 82 to the links of chains 74. A tension spring 84 anchored to frame structure 10 draws carriage 44 to which it is hooked towards the delivery end of the hearth oven holding the leading edges of conveyor bars 28 and 30 of walking board unit B close to the edges of pan supporting plates 50. The transfer gap between plates 50 and leading ends of bars 28 and 29 is held to a constantly even minimum as a result of the motion produced by the properly shaped cam surfaces 70 contacted by the rollers 72. This provides for smooth delivery of pans P from the hearth oven. The carriage 44, of course, is able to reciprocate in the manner just described because of its wheels 46 on the tracks 48. Also the spring-loaded chain tightener 88 (Fig. 1) keeps drive chain 60 taut during this movement.

Haphazard sliding of the pans P onto bars 28 and 30 is checked and alignment of the pans controlled by the corrugated cut-outs near the leadings ends of bars 28 and 30. Walking board B advances or "walks" pan P onto the aligning conveyor C.

Aligning conveyor C consists of a plurality of equally spaced endless chains 90 each of which engages a driving sprocket 92 and an idler sprocket 94. The upper run of each chain is supported on a level plane by a guide rail 96. The idler sprockets 94 are mounted on a transverse shaft 98 supported by bearing brackets 100 (Fig. 2) secured to frame structure 10. The driving sprockets 92 are mounted on a transverse driving shaft 102 supported at each end by bearing brackets 104 secured to frame structure 10. Drive shaft 102 is driven from a sprocket 106 by a chain 108 from a sprocket 110 secured to a shaft 112 of a gear reduction motor 144 on frame structure 10 of the unit.

Each chain 90 carries a pivoted pusher arm or finger 116. All fingers 116 are aligned in a straight row across the aligning conveyor system. A photoelectric sensing device having a light source 118 (Fig. 2) and a photoelectric cell 120 are adjustably attached to a pair of spaced guide boards 119 and 121, respectively, mounted on the side of the unit and arranged to throw a beam of light across conveyor chains 90 adjacent the beginning of their upper run. The photoelectric sensing device is suitably connected by conventional means (not shown) to the motor circuit of conveyor driving motor 114. An unbroken light beam keeps the motor 114 and therefore the conveyor chains 90 at rest, but as soon as a row of pans is deposited by the walking board bars 28 and 30 onto the conveyor chains 90 and into the path of the light beam, motor 114 starts and chains 90 convey pans P towards a row of arresting plates 122 mounted between chains 90. Pans P are held on plates 122 until pusher fingers 116 trailing the pans arrive to move in alignment the entire transverse row of pans P onto delivery conveyor D. Photoelectric sensing device 118, 120 may be provided with a time delay relay (not shown) to allow a small time interval so all the pans in a transverse row will arrive from the "walking board" before chains 90 move.

Fingers 116 are held upright along the upper row of chains 90 by stationary guide rails 96 engaging cam portion 117 of fingers 116. After a row of pans is pushed onto delivery conveyor D, chains 90 continue to move until a trip 124 (Fig. 1) carried by one of the chains depresses a trip finger 126 of a stop switch 128 stopping motor 114 and chains 90.

Transverse delivery conveyor D consists of a pair of spaced endless chains 130 which carry a plurality of slot type bars 132. Chains 130 are guided over a pair of suitable idler sprockets (not shown) and are driven by means of a pair of sprockets 134 (Fig. 1) mounted on a shaft 136. Shaft 136 carries another sprocket 138 driven by a chain 140 from a sprocket 142 on motor shaft 144 of a continuously driven gear reduction motor 146. Conveyor D is suitably mounted as shown on frame 10.

We claim:

1. The combination of an unloading conveyor adapted to be positioned at the delivery end of a moving hearth plate conveyor, a stationary support and a track means thereon, a carriage mounted for reciprocation on said track, a walking beam conveyor mounted on said carriage, said walking beam conveyor being formed of a plurality of longitudinal members, at least one of said plurality of longitudinal members being adapted and constructed to move as a walking beam, yieldable means urging said carriage toward one end of said track, a cam surface on said carriage positioned to engage moving members on said moving hearth oven to move said carriage on said track against said yielding member whereby the leading edge of said walking beam conveyor may follow for a short period a trajectory of the delivery edge of the hearth plate of said traveling hearth oven.

2. In a device suitable for unloading an oven hearth conveyor, comprising a stationary frame, a carriage mounted for longitudinal reciprocation on said stationary frame, a walking beam conveyor operatively mounted on said carriage, means to urge said carriage forwardly in one direction, stationary cam means on the forward end of said carriage suitable to engage a moving portion of said oven hearth conveyor to move said carriage against said means to reciprocate said carriage with said walking beam conveyor so that the leading end of said walking beam conveyor is maintained in close adjacency with the surface of said oven hearth conveyor.

3. A self-contained unit suitable for unloading an endless conveyor comprising a movable vehicle having means to arrest its movement, a carriage mounted for reciprocation on said vehicle, a walking beam conveyor operatively mounted on said carriage, an aligning conveyor operatively mounted on said vehicle and at the delivery end of said walking beam conveyor and in longitudinal alignment therewith, resilient means to move said carriage in one direction only, and cam means operatively positioned on said carriage to engage the moving part of an endless conveyor to impart movement to said carriage in a direction contrary to the movement imparted by said resilient means to reciprocate said carriage and said walking beam conveyor thereon so that said walking beam conveyor maintains a minimal close tolerance with the delivery end of said endless conveyor.

4. A self-contained unit suitable for unloading an endless conveyor comprising a movable vehicle having means to arrest its movement, a carriage mounted for reciprocation on said vehicle, a walking beam conveyor operatively mounted on said carriage, an aligning conveyor operatively mounted on said vehicle and at the delivery end of said walking beam conveyor and in longitudinal alignment therewith, resilient means to move said carriage in one direction only, cam means operatively positioned on said carriage to engage a moving part of an endless conveyor to impart movement to said carriage in a direction contrary to the movement imparted by said resilient means to reciprocate said carriage and said walking beam conveyor thereon so that said walking beam conveyor maintains a minimal close tolerance with the delivery end of said endless conveyor, an aligning conveyor positioned at the delivery end of said walking beam conveyor, said aligning conveyor comprising a plurality of spaced endless chains, at least one lug on each of said spaced endless chains, said lugs being transversely aligned with each other, and stationary plates mounted adjacent a portion of one run of said chains to receive and support articles engaged by said lugs and moved along said plates in transverse alignment with each other.

5. A self-contained unit suitable for unloading an endless conveyor comprising a movable vehicle having means to arrest its movement, a carriage mounted for reciprocation on said vehicle, a walking beam conveyor operatively mounted on said carriage, an aligning conveyor operatively mounted on said vehicle and at the delivery end of said walking beam conveyor and in longitudinal alignment therewith, resilient means to move said carriage in one direction only, cam means operatively positioned on said carriage to engage a moving part of an endless conveyor to impart movement to said carriage in a direction contrary to the movement imparted by said resilient means to reciprocate said carriage and said walking beam conveyor thereon so that said walking beam conveyor maintains a minimal close tolerance with the delivery end of said endless conveyor, an aligning conveyor positioned at the delivery end of said walking beam conveyor, said aligning conveyor comprising a plurality of spaced endless chains, at least one lug on each of said spaced endless chains, said lugs being transversely aligned with each other, stationary plates mounted adjacent a portion of one run of said chains to receive and support articles engaged by said lugs and moved along said plates in transverse alignment with each other, and means to arrest the movement of said aligning chain conveyor subsequent to the passage of said lugs beyond said delivery run of said chain conveyor, said articles having been pushed past said plates, and a detector to detect the presence of a subsequent set of articles in position at the receiving end of said delivery run of said chains to activate said chains to move a transverse series of lugs behind said articles to slide said subsequent articles across said stationary plates.

6. A self-contained unit suitable for unloading an endless conveyor comprising a support, a carriage mounted for reciprocation on said support, a pair of horizontally disposed platforms having longitudinally positioned ribs, the ribs of one platform being positioned to alternate with the ribs of the other platform, shafts rotatably mounted on said carriage, eccentric bearings on each of said shafts to support said platforms, the bearings of the one platform being angularly disposed from the bearings of the other platform, said shafts being operatively driven so that upon rotation of said shafts said platforms oscillate on said eccentric bearings to operate as a walking beam conveyor on said carriage only, and cam means operatively positioned on said carriage to engage a moving part of an endless conveyor and to impart movement to said carriage to maintain the leading ends of said platform a minimum close clearance from the delivery end of said endless conveyor.

7. In combination with a continuous hearth plate conveyor having hearth plates transversely supported between continoously moving parallel spaced endless chains, a carriage mounted adjacent the delivery end of said hearth conveyor, said carriage being mounted for reciprocation toward and away from said conveyor and in a direction longitudinal thereto, a walking beam conveyor operatively mounted on said reciprocable carriage, means to urge said carriage toward said hearth conveyor, cam means positioned at the leading end of said carriage to engage said hearth conveyor to translate motion from said hearth conveyor to said carriage to move said carriage against said urging means to reciprocate said carriage so that the leading end of the walking beam conveyor follows the leading delivery edge of the transverse plates of said hearth conveyor, an aligning conveyor positioned at the delivery end of said walking beam conveyor, said aligning conveyor comprising a plurality of spaced parallel endless chains positioned to receive along the upper run of said chains articles transported by said walking beam conveyor, at least one upstanding lug on each chain, said lugs being transversely aligned with each other, stationary plates mounted adjacent a portion of the upper run of said chains, the upper surface of said plates being coincident with or slightly above the plane of the upper run of said chains, and means to intermittently drive said chains so that said lugs slide articles across said plates in transverse alignment with each other.

8. In combination with a continuous hearth plate conveyor having hearth plates transversely supported between continuously moving parallel spaced endless chains, a carriage mounted adjacent the delivery end of said hearth conveyor, said carriage being mounted for reciprocation toward and away from said conveyor and in a direction longitudinal thereto, a walking beam conveyor operatively mounted on said reciprocable carriage, means to urge said carriage toward said hearth conveyor, cam means positioned at the leading end of said carriage to engage said hearth conveyor to translate motion from said hearth conveyor to said carriage to move said carriage against said means to reciprocate said carriage so that the leading end of the walking beam conveyor follows the leading delivery edge of the transverse plates of said hearth conveyor, an aligning conveyor positioned at the delivery end of said walking beam conveyor, said aligning conveyor comprising a plurality of spaced parallel endless chains positioned to receive along the upper run of said chains articles transported by said walking beam conveyor, at least one upstanding lug on each chain, said lugs being transversely aligned with each other, motor means to drive said chains in unison, detector means adjacent the receiving end of the upper run of said chains operative to activate said motor means to drive said chains when articles are placed on said upper run, and other means operative to de-activate said motor means after said lugs have completed a delivery transit and delivered aligned articles to the delivery end of the upper run of said aligning conveyor so that said receiving end of said conveyor is free to receive a succeeding row of articles.

9. A device as set forth in claim 8, further characterized by a transverse conveyor mounted at the delivery end of said aligning conveyor, said stationary plates extending beyond said aligning conveyor toward said transverse conveyor to substantially bridge the gap between said conveyors so that articles fed in transverse alignment by said lugs on said alignment conveyor are moved from said alignment conveyor across said stationary plates and onto said transverse conveyor and are aligned longitudinally on said transverse conveyor.

10. In combination with a continuous hearth conveyor having hearth plates transversely supported between continuously moving parallel spaced endless chains, a carriage mounted adjacent the delivery end of said hearth conveyor, said carriage being mounted for reciprocation toward and away from said conveyor and in a direction longitudinal thereto, a walking beam conveyor operatively mounted on said reciprocable carriage, means to urge said carriage toward said hearth conveyor, cam means positioned at the leading end of said carriage to engage said hearth conveyor to translate motion from said hearth conveyor to said carriage to move said carriage against said means to reciprocate said carriage so that the leading end of the walking beam conveyor follows the leading delivery edge of the transverse plates of said hearth conveyor, an aligning conveyor positioned at the delivery end of said walking beam conveyor, said aligning conveyor comprising a plurality of spaced parallel endless chains positioned to receive along the upper run of said chains articles transported by said walking beam conveyor, at least one upstanding lug on each chain, said lugs being transversely aligned with each other, motor means to drive said chains in unison, photoelectric detector means adjacent the receiving end of the upper run of said chains operative to activate said motor means to drive said chains when articles are placed on said upper run, and other means operative to de-activate said motor means after said lugs have completed a delivery transit and delivered aligned articles to the delivery end of the upper run of said aligning conveyor so that said receiving end of said conveyor is free to receive a succeeding row of articles.

11. An unloading unit suitable to receive trays from an endless hearth plate conveyor comprising parallel spaced endless chains having sprocket engaging rollers and transverse hearth plates mounted between said chains to support articles, said unit comprisnig a movable vehicle having leveling means, a carriage mounted for reciprocation on said vehicle, resilient means urging said carriage in a forward direction, a walking beam conveyor operatively mounted on said reciprocating carriage, cam means mounted to engage the rollers of the chains of the endless conveyor as said rollers pass around the sprocket at the delivery end of said endless conveyor to impart reciprocating motion to said carriage, so that the leading end of the walking beam conveyor mounted thereon follows the edge of the transverse plates of said endless hearth conveyor to provide a minimum gap between the edge of said plates and said walking beam conveyor for the ready transfer of articles from said endless conveyor to said walking beam conveyor, said leveling means on said vehicle being suitable to accurately adjust the level of said walking beam conveyor to said endless hearth conveyor, said conveyor further supporting an endless alignment conveyor at the receiving end of its operative upper run adjacent the delivery end of said walking beam conveyor, said aligning conveyor comprising a plurality of endless spaced parallel chains, each chain having at least one finger mounted thereon, the fingers of each chain being transversely aligned with each other, and means to support articles while said fingers move said articles thereon in transverse alignment.

12. The combination of an unloading unit with a hearth oven, said hearth oven having a moving hearth conveyor comprising a pair of spaced endless chains having links and sprocket-engaging rollers, transverse plates supported between said chains and a pair of sprockets supporting each of said chains to provide an upper operative horizontal run, said unloading unit being positioned adjacent the delivery sprocket of said hearth conveyor and comprising a carriage mounted to reciprocate toward and away from said hearth conveyor and in a direction longitudinal therewith, a walking beam conveyor mounted on said carriage and operable to transport articles placed thereon in a direction away from said conveyor and longitudinal thereto, a stationary cam mounted on the leading end of said carriage and shaped to engage the rollers of said chain during the movement thereof about the delivery sprocket, and resilient means to urge said carriage and said cams into engagement with said rollers so that the leading end of said walking beam conveyor follows the edge of said transverse plates of said hearth conveyor as it moves about a segment of said sprocket.

13. An unloading unit suitable to receive articles from an endless hearth plate conveyor of the type having parallel spaced endless chains with sprocket engaging rollers and transverse hearth plates mounted between said chains to support articles, said unit comprising a carriage mounted for reciprocation toward and away from the delivery end of said endless hearth plate conveyor, resilient means urging said carriage in one direction, a conveyor operatively mounted on said reciprocating carriage, said conveyor being constructed and arranged to transfer articles therealong by longitudinal forward and backward motion of the article supporting members of said conveyor, cam means on said carriage constructed and arranged to engage the rollers of the chains of said endless conveyor as said rollers pass around the sprocket at the delivery end of said endless conveyor to impart reciprocating motion to said carriage, so that the receiving portion of said conveyor on said carriage will follow the leading edges of said transverse plates of said endless hearth conveyor to maintain a minimum gap between a leading edge of said plates and the receiving portion of said conveyor for the smooth transfer of articles from said endless hearth plate conveyor to said conveyor on said unloading unit.

References Cited in the file of this patent

UNITED STATES PATENTS

| | | |
|---|---|---|
| 1,715,204 | Lorenz | May 28, 1929 |
| 2,534,667 | Guggenheim | Dec. 19, 1950 |